US010215574B2

(12) United States Patent
Cun et al.

(10) Patent No.: US 10,215,574 B2
(45) Date of Patent: Feb. 26, 2019

(54) FACILITATING RIDER PICK-UP FOR A TRANSPORT SERVICE

(71) Applicant: Uber Technologies, Inc., San Francisco, CA (US)

(72) Inventors: Benjamin Le Cun, San Francisco, CA (US); John David West, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 484 days.

(21) Appl. No.: 14/820,382

(22) Filed: Aug. 6, 2015

(65) Prior Publication Data

US 2017/0038948 A1 Feb. 9, 2017

(51) Int. Cl.
*G06F 3/01* (2006.01)
*G01C 21/34* (2006.01)
(Continued)

(52) U.S. Cl.
CPC ....... *G01C 21/343* (2013.01); *G01C 21/3438* (2013.01); *G01C 21/367* (2013.01);
(Continued)

(58) Field of Classification Search
CPC .................................................. G01C 21/367
See application file for complete search history.

(56) References Cited

U.S. PATENT DOCUMENTS

| 6,028,537 A | 2/2000 | Suman |
| 8,646,194 B2 * | 2/2014 | Podd .................... H05B 37/029 |
| | | 362/249.12 |

(Continued)

FOREIGN PATENT DOCUMENTS

| CN | 201918124 | 8/2011 |
| CN | 202213529 | 5/2012 |

(Continued)

OTHER PUBLICATIONS

International Search Report in PCT/US2015/014406 dated May 13, 2015.

(Continued)

*Primary Examiner* — William L Bashore
*Assistant Examiner* — Nathan K Shrewsbury
(74) *Attorney, Agent, or Firm* — Mahamedi IP Law LLP

(57) ABSTRACT

A transport facilitation system is disclosed that can facilitate pick-ups in connection with a transportation arrangement service. The transport facilitation system can initially receive a pick-up request from a user device of a requesting user and select a driver to service the pick-up request. The transport facilitation system can transmit an invitation to service the pick-up request to a driver device of the driver and receive a confirmation to service the pick-up request from the driver device. Thereafter the transport facilitation system can, detect, from the user device, a sensor pattern corresponding to a hailing action performed by the requesting user using the user device. In response to detecting the sensor pattern, the transport facilitation system can initiate a selected display pattern on a graphical user interface (GUI) of the user device to enable the driver to identify the requesting user.

18 Claims, 7 Drawing Sheets

(51) Int. Cl.
  *G01C 21/36* (2006.01)
  *G06F 9/451* (2018.01)
  *G06Q 50/30* (2012.01)
  *G06F 3/0484* (2013.01)

(52) U.S. Cl.
  CPC ............ *G06F 3/017* (2013.01); *G06F 3/0484* (2013.01); *G06F 9/453* (2018.02); *G06F 2200/1637* (2013.01); *G06Q 50/30* (2013.01)

(56) References Cited

U.S. PATENT DOCUMENTS

| | | | |
|---|---|---|---|
| 2002/0125839 A1 | 9/2002 | Yen | |
| 2005/0227704 A1* | 10/2005 | Ferra | H04M 15/06 455/456.1 |
| 2007/0183156 A1* | 8/2007 | Shan | B60Q 1/2611 362/277 |
| 2008/0298058 A1 | 12/2008 | Kan | |
| 2009/0192851 A1* | 7/2009 | Bishop | G06Q 10/08 705/26.3 |
| 2011/0102165 A1* | 5/2011 | Rahamim | B60Q 1/52 340/434 |
| 2012/0092194 A1* | 4/2012 | Crucs | G08G 1/123 340/994 |
| 2012/0137256 A1 | 5/2012 | Lalancette | |
| 2012/0203599 A1* | 8/2012 | Choi | G06Q 30/02 705/13 |
| 2013/0150004 A1* | 6/2013 | Rosen | H04W 8/22 455/414.1 |
| 2014/0067488 A1* | 3/2014 | James | G06Q 30/02 705/13 |
| 2014/0130387 A1* | 5/2014 | Pod | G09F 9/33 40/575 |
| 2014/0223787 A1* | 8/2014 | Richmond | G09F 9/33 40/575 |
| 2015/0161564 A1* | 6/2015 | Sweeney | G06Q 10/063114 705/338 |
| 2015/0317568 A1* | 11/2015 | Grasso | G06Q 10/1093 705/5 |
| 2015/0345743 A1 | 12/2015 | Trincia | |
| 2016/0042303 A1* | 2/2016 | Medina | G06Q 10/02 705/5 |
| 2016/0356615 A1* | 12/2016 | Arata | G01C 21/3438 |
| 2016/0377445 A1* | 12/2016 | Rodoni | G01C 21/36 701/428 |
| 2016/0378303 A1* | 12/2016 | Crilley | G06T 13/80 715/733 |
| 2017/0017374 A1* | 1/2017 | Herz | G06F 3/04817 |
| 2017/0126810 A1* | 5/2017 | Kentley | H04L 67/125 |

FOREIGN PATENT DOCUMENTS

| | | |
|---|---|---|
| GB | 2473831 | 3/2011 |
| JP | 1992027220 | 5/1990 |
| JP | 2000082199 | 3/2000 |
| JP | 2012088925 | 5/2012 |
| KR | 10-2012-0090480 | 8/2012 |

OTHER PUBLICATIONS

Office Action dated Feb. 8, 2017 in Canadian App. No. 2,948,472.
Office Action dated Mar. 3, 2017 in Australian App. No. 2015259802.
Examination Report dated Oct. 12, 2017 in Australian App. No. 2017206210.
Office Action dated Apr. 17, 2018 in Japanese Application No. 2016567642.

* cited by examiner

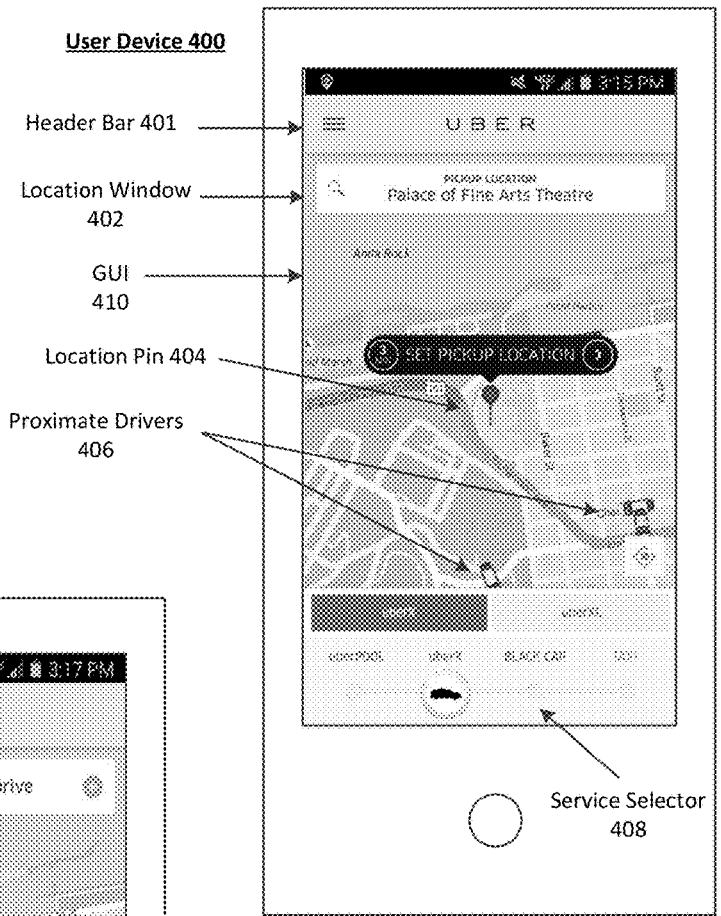
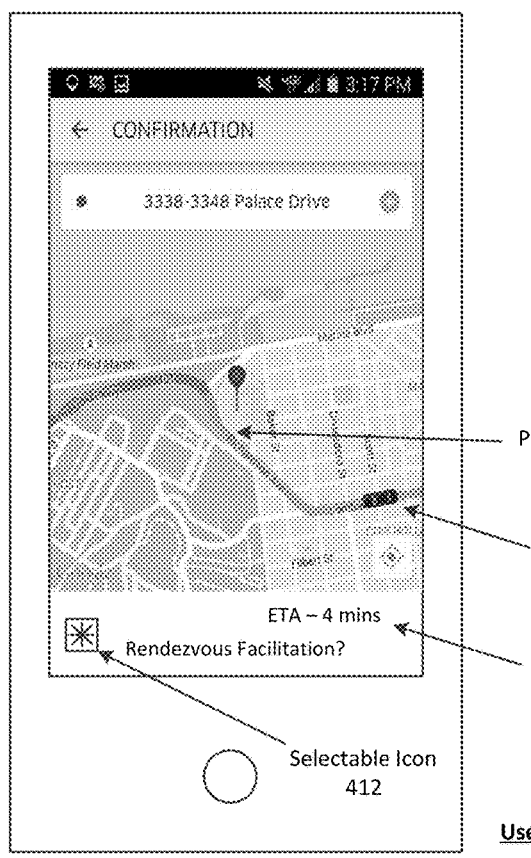
FIG. 4B
FIG. 4A

FACILITATING RIDER PICK-UP FOR A TRANSPORT SERVICE

BACKGROUND

With the advent of application-based, on-demand transportation services, the connectivity between riders and drivers is vastly expanding. When localized demand for transport services surges, such as upon conclusion of a sporting event or a crowded flight landing at the airport, multiple riders expecting imminent pickup by transport vehicles can cause confusion regarding which vehicle is assigned to which rider.

BRIEF DESCRIPTION OF THE DRAWINGS

The disclosure herein is illustrated by way of example, and not by way of limitation, in the figures of the accompanying drawings in which like reference numerals refer to similar elements, and in which:

FIGS. 4A and 4B are example screenshots illustrating a user device executing a designated user application, as described herein;

DETAILED DESCRIPTION

Figure 1:
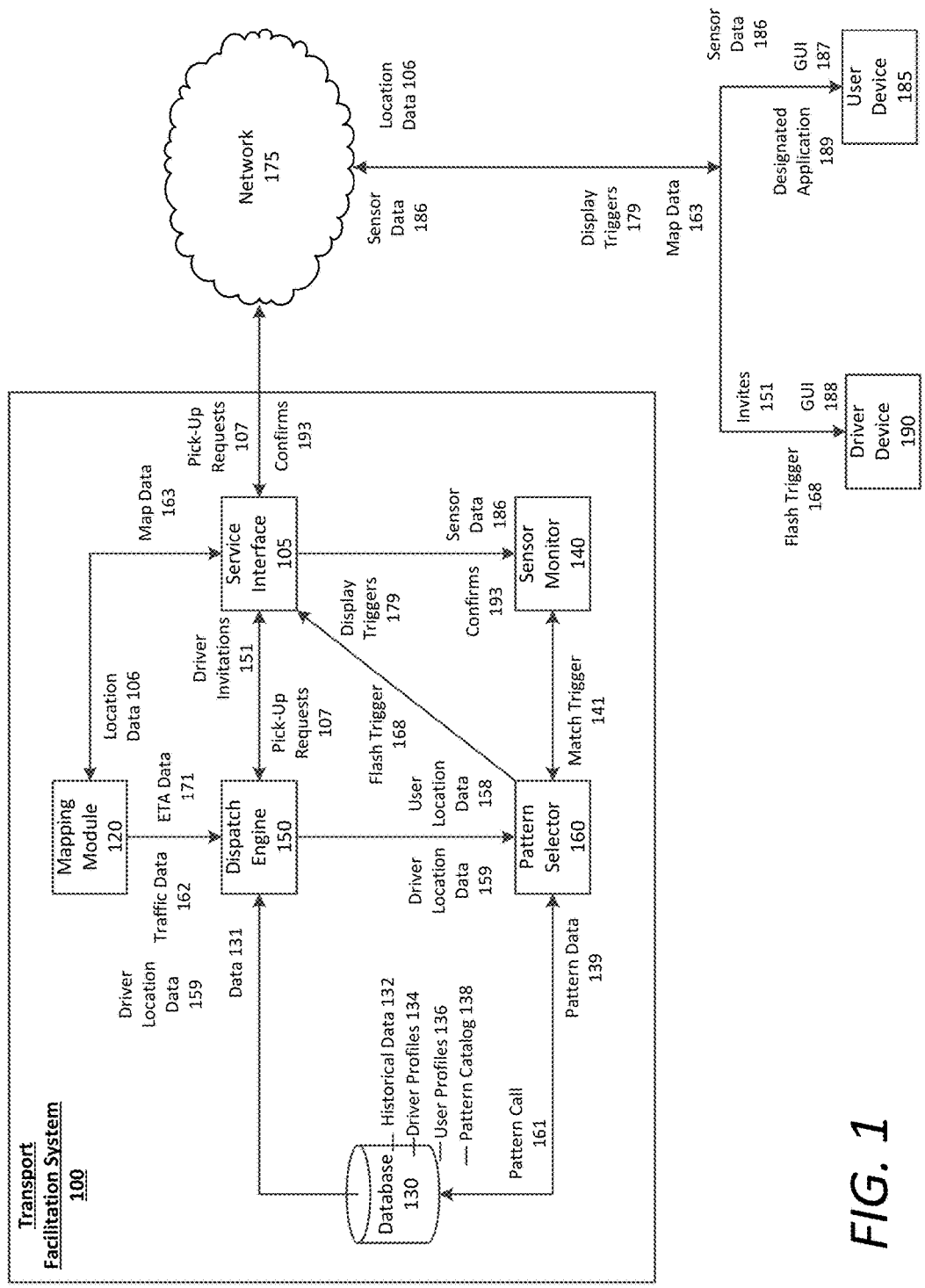
FIG. 1 is a block diagram illustrating an example transport facilitation system as described herein.

In some examples described herein, a transport facilitation system is provided to facilitate networked transportation services by matching drivers with requesting users. In accordance with examples described herein, the transport facilitation system can receive, over one or more networks, a pick-up request from a user device of a requesting user, and provide an invitation to a driver device of proximate available driver to service the pick-up request. Each of the user device and the driver device can run a designated application in communication with the transport facilitation system. Upon receiving confirmation to service the pick-up request from the selected driver, the transport facilitation system can provide an additional facilitation service to enable the driver and requesting user to rendezvous without confusion or mistaken drive-by events.

According to many examples, this additional facilitation service can include monitoring sensor data from the requesting user's mobile computing device to identify a sensor pattern that matches the requesting user performing a designated action (e.g., a hailing action) with the user device. Upon detecting the sensor pattern, the transport facilitation system can initiate a display pattern on a graphical user interface (GUI) of the user device. The display pattern can be pushed to cover the entirety of the GUI, or a selected portion. Additionally, detection of the sensor pattern on the user device can further cause a display pattern to be initiated on a select portion or the entirety of the GUI of the driver device. In many examples, the display pattern may be initiated on the entirety of the GUI on the user device and a select portion, such as a header bar or a status bar on the driver device.

In certain implementations, detection of the sensor pattern on the user device can further cause a light element on the reverse side of the driver device (e.g., the camera flash light) to illuminate or flash at a selected frequency to further facilitate the rendezvous. As an example, upon receiving confirmation of pick-up, the user can view a live map on the GUI of the user device showing an indicator of the driver. As the driver comes within visual proximity, the user can perform an action, such as a hailing action, using the user device. The transport facilitation system can detect a sensor pattern (e.g., via an accelerometer and/or a gyroscopic sensor of the user device) corresponding to the user action, and cause the display pattern to be presented on the user device. The driver may be able to see the distinctive display pattern on the user device as well as on a header bar of the driver device to enable the driver to instantaneously identify the user. Typically, the driver device is mounted on a dash of the driver's vehicle with the reverse side of the driver device exposed through the windshield of the vehicle. Thus, as an addition, the light element on the reverse side of the driver device can also be initiated by the transport facilitation system to enable the user to identify the driver, and further facilitate the rendezvous.

Among other benefits, the examples described herein achieve a technical effect of improving user and driver experience in connection with transportation services by facilitating a successful rendezvous between the requesting user and the driver, and avoiding inefficiencies such as mistaken drive-by events. In crowded areas, such as airport terminals or sporting event locations, several distinct would-be riders seeking pick-up combined with several drivers seeking their assigned riders can create confusion, disrupt the flow of traffic, and even create hostility amongst would-be riders. Examples presented herein can facilitate orderly rendezvous between would-be riders and drivers seeking to pick up the correct rider.

As used herein, a computing device refer to devices corresponding to desktop computers, cellular devices or smartphones, personal digital assistants (PDAs), laptop computers, tablet devices, television (IP Television), etc., that can provide network connectivity and processing resources for communicating with the system over a network. A computing device can also correspond to custom hardware, in-vehicle devices, or on-board computers, etc. The computing device can also operate a designated application configured to communicate with the network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Description

FIG. 1 is a block diagram illustrating an example transport facilitation system 100 for enabling drivers to effectively service the pick-up requests 107 of requesting users. The service or platform associated with the transport facilitation system 100 provides that riders and drivers can be matched for receiving and providing transportation services. For example, the service can be accessible on user devices 185 and driver devices 190 via execution of a designated client application 189, which can generate a graphical user interface (GUI) 187 specific to the user device 185, and a GUI 188 specific to the driver device 190 (e.g., a rider application or a driver application, respectively). When a driver is selected to service a particular pick-up request 107, the transport facilitation system 100 can generate and transmit an invitation 151 to the selected driver's computing device 190 (running the driver application) to service the pick-up request 107.

The transport facilitation system 100 can include a service interface 105 to receive pick-up requests 107 from requesting users over a network 175. The pick-up requests 107 can be processed by a dispatch engine 150, which can identify an available proximate driver to service each pick-up request 107. The transport facilitation system 100 can include a mapping module 120, which can receive location data 106 from the user device 185 (e.g., GPS resources or via the pick-up request 107, which can identify a pick-up location), and provide the dispatch engine 150 with traffic data 162 and/or ETA data 171 for proximate drivers around the requesting user. Alternatively, the transport facilitation system 100 can utilize a third party mapping service to perform matching operations and provide map data 163 to the user device 185 and the driver device 190.

In various implementations, the dispatch engine 150 can also receive location data corresponding to driver locations 159 within a given region or area. The driver locations 159 proximate to the pick-up location can be utilized by the dispatch engine 150 to select a driver to service the pick-up request 107. The driver may be selected by the dispatch engine 150 from a plurality of available drivers proximate to the pick-up location. In many examples, the dispatch engine 150 can pick an optimal driver from the plurality (e.g., a driver that has the shortest ETA or a driver whose current location is the shortest distance from the pick-up location). Additionally or alternatively, the dispatch engine 150 can select a driver based on other factors, utilizing data 131 from a database 130 of the transport facilitation system 100. Such data 131 can include historical data 132, driver profile data 134, and user profile data 136 compiled by the transport facilitation system 100 that can enable the dispatch engine 150 to make more optimal selections. For example, the dispatch engine 150 can identify user ratings, driver ratings, reputation information, and various other relevant factors that may allow for a more optimal driver selection.

According to examples, once the dispatch engine 150 selects the driver to service the pick-up request 107, the dispatch engine 150 can assign the selected driver to service the pick-up request 107. Alternatively, the dispatch engine 150 can generate and transmit a driver invitation 151 to the driver device 190 of the selected driver over the network 175. The GUI 188 of the driver device 190 can present the invitation 151, and the driver can confirm to service the pick-up request 107. The confirmation 193 can be received by the transport facilitation system 100 via the service interface 105, and can trigger a number of actions.

In certain examples, the confirmation 193 from the driver device 190 can cause the mapping module 120 to provide map data 163 to the user device 185 and the driver device 190 indicating the respective locations of the requesting user and the driver. The map data 163 can include a live map on the GUIs 187, 188 showing an indication or icon representing the driver's real-time location relative to the requesting user. The map data 163 can also include an ETA for the rendezvous.

In some examples, the GUI 187 of the user device 185 can include a selectable feature, such as an icon, to enable a display pattern feature for facilitating an easier rendezvous, such as when the user is in a crowded area. For example, the user can determine, viewing the map data 163 on the GUI 187, when the driver is within visual distance from the pick-up location. The user may select the display pattern feature on the GUI 187, which can initiate a display pattern to be presented on the display screen of the user device 185. Accordingly, as the driver approaches, the user can hold up the user device 185, to allow the driver to easily identify the user for the pick-up.

Additionally or alternatively, selection of the display pattern feature on the user device 185 can cause the transport facilitation system 100 to trigger actions on the driver device 190 as well. For example, upon detecting a selection of the display pattern feature on the user device 185, the transport facilitation system 100 can identify the display pattern being displayed on the user device 185 and can cause the same display pattern to be presented on at least a portion of the GUI 188 of the driver device 190 (e.g., a header bar or status bar). Accordingly, the driver can readily match the display pattern presented on the user device 185, as the requesting user holds up the user device 185, with the same display pattern being presented on the portion of the driver device 190. As a further addition, the transport facilitation system 100 can also cause a light element on the reverse side of the driver device 190, such as the camera flash light, to illuminate or flash at a given frequency to allow the requesting user to more readily identify the driver.

In such examples, the driver may mount the driver device 190 on a location (e.g., the dashboard, the driver's side door frame, the driver's side windshield frame, the rear view mirror, etc.) in which the rear of the driver device 190 is visible through the windshield of the driver's vehicle. The device mount may include an aperture or gap portion that allows the light element on the rear of the driver device 190 to be visible from outside the vehicle. Thus, when the light element (e.g., the camera flash light) illuminates as the vehicle approaches the requesting user, the requesting user can more easily identify the driver's vehicle.

As an addition or alternative, the confirmation 193 from the driver device to service the pick-up request 107 can trigger a sensor monitor 140 of the transport facilitation system 100 to monitor sensor data 186 from the requesting user's device 185. The transport facilitation system 100 can automatically monitor the sensor data 186 from the user device 185, or the monitoring can be triggered by the user selecting the display pattern selection feature on the GUI 187.

According to many examples, the sensor monitor 140 can dynamically monitor the sensor data 186 from the user device 185 to identify a distinct sensor pattern that may be correlated to a user action performed while holding the user device 185. As an example, the user action may be a hailing action while holding the user device 185, in which the user turns the user device 185 such that the display screen faces away from the requesting user and raises the user device 185 as if hailing a taxi-cab. This action enables the approaching driver to readily view the display screen of the user device 185.

The sensor pattern identified in the sensor data 186 by the sensor monitor 140 can reflect the hailing action performed by the requesting user. Alternate user actions are also contemplated, such as a hailing action combined with a shaking or a twisting of the user device 185, or an alternative action altogether (e.g., a shaking or a twisting of the user device 185, or an action in which the user merely turns the user device 185 such that the display screen is viewable by the approaching driver). The sensor data 186 monitored by the sensor monitor 140 may originate from any of the sensor resources of the user device 185. For example, the sensor monitor 140 can dynamically analyze accelerometer and/or gyroscopic sensor data from the user device 185. Additionally or alternatively, the sensor monitor 140 can dynamically analyze a camera viewing area using the camera resources of the user device 185. In such implementations, the display pattern may be triggered by camera data showing the user performing the designated action (e.g., the hailing action). However, any combination of sensor data 186 received from the user device 185 can indicate the predetermined sensor pattern that can trigger the display pattern to be initiated on the display screen of the user device 185.

In some examples, the user can configure the particular sensor pattern (e.g., by recording a gesture, such as a shaking of the user device 185 or specific hailing action that the user can perform to trigger the display pattern). Accordingly, the configured gesture or action performed by the user can be stored and associated with the user's profile so that the sensor monitor 140 can utilize the stored, user-configured sensor pattern to identify when to trigger the display pattern on the display screen of the user device 185

Additionally or alternatively, the user can activate the display pattern through a different action on the user device 185. For example, the designated application 189 on the user device 185 can repurpose an analog button, such as the power button, on the user device 185 when a pick-up is requested or when a driver approaches within a predetermined distance (e.g., 200 feet of the pick-up location). Accordingly, the user can depress an analog button of the user device to trigger the display pattern. In other variations, the GUI 187 on the user device 185 can display a selection feature, such as a selectable icon, that the user can press to trigger the display pattern. As provided herein, once the display pattern is triggered on the user device 185, the transport facilitation system 100 can transmit a trigger signal to cause a similar or the same display pattern to be displayed on at least a portion of the driver device 190.

In certain implementations, the transport facilitation system 100 can include a pattern selector 160 which can access a pattern catalog 138 in the database 130. The pattern selector 160 can dynamically monitor driver location data 159 corresponding to the locations of all drivers proximate to the pick-up location, and/or user location data 158 corresponding to other requesting users within proximity of the requesting user. The driver location data 159 and/or the user location data 158 can be received from the dispatch engine 150 or the mapping module 120, and can enable the pattern selector 160 to select a display pattern for each requesting user/driver pair such that the same or similar display patterns are not initiated on multiple user/driver pairs—which can cause confusion. Thus, the pattern selector 160 can identify other display patterns in the pattern catalog 138 designated for other user/driver pairs in the vicinity of the requesting user, and disregard those display patterns for use in the current instance.

In such examples, the pattern catalog 138 may comprise a live log indicating correlations between a set of display patterns and user/driver pairings for a given region or vicinity (e.g., an airport terminal with a crowd of arrivals). Thus, the pattern selector 160 can dynamically manage and utilize this live pattern catalog 138 to avoid the same or similar display patterns being used by multiple proximate users.

Upon detecting the sensor pattern in the sensor data 186 from the user device 185, the sensor monitor 140 can generate a match trigger 141 for transmission to the pattern selector 160. The match trigger 141 can cause the pattern selector 160 to select a display pattern from the pattern catalog 138. Once selected, the pattern selector 160 can generate and transmit a display trigger 179, via the service interface 105 and network 175, to the user device 185 in order to initiate the selected display pattern for display on the display screen of the user device 185.

In some examples, the requesting user can choose the display pattern, in which case the transport facilitation system 100 can associate the selected display pattern with the requesting user's user profile 136. In such examples, the pattern selector 160 can generate and transmit a pattern call 161 to the database 130 with user data (e.g., a unique identifier of the requesting user) in order to receive pattern data 139 corresponding to the user-selected display pattern in the user profile 136. The pattern selector 160 may then transmit a display trigger 179 comprising the pattern data 139 for the preselected display pattern to the user device 185 for display.

As an addition or alternative, upon receiving the match trigger 141 from the sensor monitor 140, the pattern selector 160 can make a pattern call 161 to the catalog 138 in order to select a display pattern not designated to user/driver pairs within a predetermined distance from the requesting user. Upon selecting an "unused" display pattern, the pattern selector 160 can generate a display trigger 179 comprising the pattern data 139 for the selected pattern. The display trigger 179 can be transmitted to the user device 185 over the network 175, and can cause the user device 185 to initiate the selected display pattern on the whole GUI 187, or a selected portion of the GUI 187.

Additionally, the transport facilitation system 100 can transmit the display trigger 179 to the driver device 190 to further facilitate the rendezvous. The display trigger 179 can cause the driver device 190 to initiate the same selected display pattern as the pattern initiated on the GUI 187 of the user device 185. On the driver device 190, the display pattern can encompass the whole GUI 188, or a select portion of the GUI 188 to allow for a consistent view of the map/directions presented on the GUI 188. As such, the display pattern can be initiated on a header bar, and/or the display trigger 179 can cause the display pattern to be pushed for display on the status bar of the driver device 190. Thus, the identification of the sensor pattern corresponding to the user action (e.g., the hailing action) can trigger the display pattern to be initiated on both the user device 185 and the driver device 190.

Additionally, the transport facilitation system 100 can further transmit a flash trigger 168 to the driver device 190, which can cause a light element (e.g., the camera flash light) on the rear side of the driver device 190 to illuminate or flash. For example, the driver application can interface with hardware components of the driver device 190 to trigger on or off a light source of the driver device 190. The flash trigger 168 can be transmitted simultaneously with the display triggers 179. As such, the detected sensor pattern corresponding to the user action (e.g., the hailing action using the user device 185) can trigger the selected display pattern to be displayed on the GUI 187 of the user device 185 (e.g., on the whole GUI 187) and the GUI 188 of the driver device 190 (e.g., on the header bar), as well as initiating the camera flash on the rear side of the driver device 190. Thus, as the driver approaches the pick-up location, the driver can perceive the display pattern on both the user device 185 and the driver device 190 in a manner that is minimally invasive to the driver's attention, but makes clear the identification of the requesting user. Additionally, the requesting user can identify the camera flash on the rear of the driver device 190 through the vehicle's windshield to readily locate the driver.

In variations, the display pattern may be triggered by the driver device 190 crossing a threshold distance from the user device 185. In such variations, the transport facilitation system 100 can utilize the map data 163 to set a radius or a geo-fence around the pick-up location. Once the approaching driver crosses the geo-fence threshold, the display patterns may be triggered on the user device 185 and the driver device 190, as well as the camera flash on the driver device 190. Thus, as the driver approaches and crosses the threshold, the requesting user can observe the display pattern being generated on the display screen of the user device 185 and hold up the user device 185 for the driver to see. At the same time, the display pattern can also be generated on the display screen of the driver device 190, as well as the camera flash.

The display patterns and camera flash on the user device 185 and the driver device 190 respectively, can be executed for a predetermined period of time (e.g., 3-5 seconds), and/or can be deactivated via a predetermined action. The action can comprise a screen tap or detecting a completion of the hailing action (e.g., the sensor monitor 140 detecting a reverse pattern to the hailing action). The deactivating action may be performed by the requesting user on the user device 185 or the driver on the driver device 190, or both. Alternatively, deactivation of the display pattern may be instigated via any of a number of analog buttons or keys on either the user device 185 or the driver device 190 (e.g., the power button, "home" key, or volume toggle).

The display pattern may be any color or combination of colors, or may be any visually distinctive display pattern in relation to a real-world background. The display pattern can flash between solid colors on the GUIs 187, 188 at a predetermined frequency, or display changing visual patterns or shapes. As an example, a user can preselect a color combination of bright green and bright yellow. Upon seeing an approaching driver, the user can hail the driver with the user's mobile device, and the colors bright green and bright yellow can alternate flashing on the display screen at a certain frequency. The same colors can flash at the same frequency on the header bar and/or status bar of the driver device.

As an addition or alternative, execution of the designated application 189 on the user device 185 can utilize the sensors and processing resources of the user device 185 in order to perform one or more operations described above in connection with the transport facilitation system 100. For example, the user device 185 can execute the functionality of the sensor monitor 140 to compare and identify sensor data 186 with a predetermined sensor profile in order to trigger the display pattern on the GUI 187. As discussed herein, the predetermined sensor profile can be standardized by the transport facilitation system 100 as a type of hailing action, and can be stored locally on the user device 185. Alternatively, the sensor profile can be selected by the user from any number of preconfigured motions and/or actions. Additionally or alternatively, the sensor profile can be recorded and stored by the user, so that when the driver approaches, the user can repeat the motion corresponding to the recorded sensor profile to trigger the display pattern on the display.

As an example, when the driver approaches (e.g., when the driver is a predetermined distance from the user or the pick-up location), the system 100 can provide the user device 185, via the designated application 189, with data to enable the processing resources of the user device 185 to detect the action performed by the user (e.g., a hailing action with the user device 185) by comparing sensor data 186 from sensors on the user device 185 with the sensor profile or pattern corresponding to the action. When the user device 185 detects a match, the designated application 189 can trigger the display pattern on the display screen of the user device 185. Additionally or alternatively, the user may be prompted by the designated application 189 to perform the action when the driver is approaching. For example, an alert may be provided on the display screen of the user device 185 when the driver crosses within a predetermined distance or time from the user.

In many examples, the designated application 189 can prevent the display pattern from being presented on the display screen of the user device 185 until the driver is within the predetermined distance (e.g., 250 feet) from the user or the pick-up location. Accordingly, if the sensor data 186 is detected locally on the user device 185 before the driver approaches, the display on the user device 185 will not be affected. However, once the driver crosses the threshold distance from the user (e.g. as detected by the designated application 189 running on the user device 185), the display pattern feature can be enabled on the user device 185 by the designated application 189. Thus, when the sensor pattern is detected on the user device 185 thereafter, the designated application 189 can change the GUI 187 to the display pattern. In conjunction, the designated application 189 can also send a message or signal to the system 100 to notify the system 100 of the display pattern, so that the system 100 can then trigger the driver device 190 to display the same display pattern (e.g., on the header bar of the driver device 190), as discussed herein.

Methodology

Figure 2:
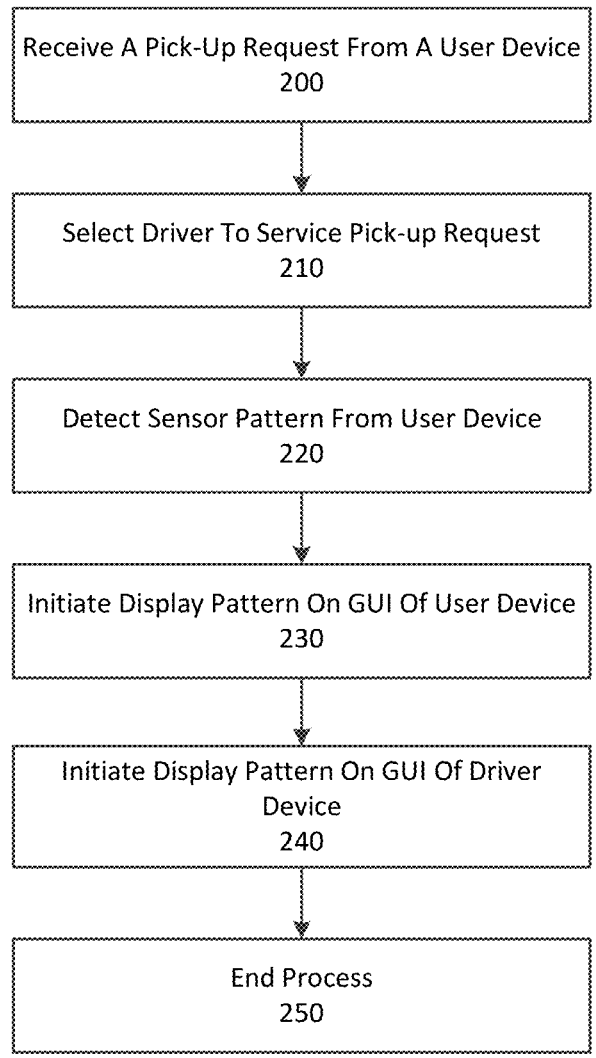
FIG. 2 is a high level flow chart illustrating an example method for facilitating a pick-up in connection with a transportation arrangement service.

FIG. 2 is a high level flow chart illustrating an example method for facilitating a pick-up in connection with a transportation arrangement service. In the below description of FIG. 2, reference may be made to like reference characters representing various features of FIG. 1 for illustrative purposes. Furthermore, the high level method described in connection with FIG. 2 may be performed by an example transport facilitation system 100, as illustrated in FIG. 1. Referring to FIG. 2, the transport facilitation system 100 can receive a pick-up request 107 from a user device 185 of a requesting user (200) (e.g., a user device running a designated user application in connection with a transportation arrangement service). The transport facilitation system 100 can select one of any number of proximate drivers to service the pick-up request (210). The selected driver can then follow a map or otherwise travel to the pick-up location to pick up the requesting user. As the driver approaches, the requesting user can perform an action, such as a hailing action with the user device 185. The hailing action can be detected by the transport facilitation system 100 by correlating a sensor pattern based on sensor data 186 from the user device 185 with a predetermined sensor pattern stored at the transport facilitation system 100 (220).

For example, the predetermined sensor pattern can indicate combinations of actions that denote a hailing action. As such, the transport facilitation system 100 can perform a comparison technique, such as a matching algorithm, to determine whether a detected sensor pattern from the user device 185 matches the predetermined sensor pattern. This determination can comprise a probabilistic computation in which a match is identified when the match probability crosses a predetermined threshold (e.g., a 75% match). Accordingly, once a match is identified in the sensor pattern, the transport facilitation system 100 can initiate, on the GUI 187 of the user device 185, a display pattern (230). Additionally, the transport facilitation system 100 can initiate the same display pattern on the GUI 188 of the driver device 190 (240). This can allow the driver to view both the display pattern on the display screen of the driver device 190 and the display screen of the user device 185, in order to better facilitate the rendezvous. Once the pick-up has been made the display patterns are deactivated and the process ends (250).

Figure 3:
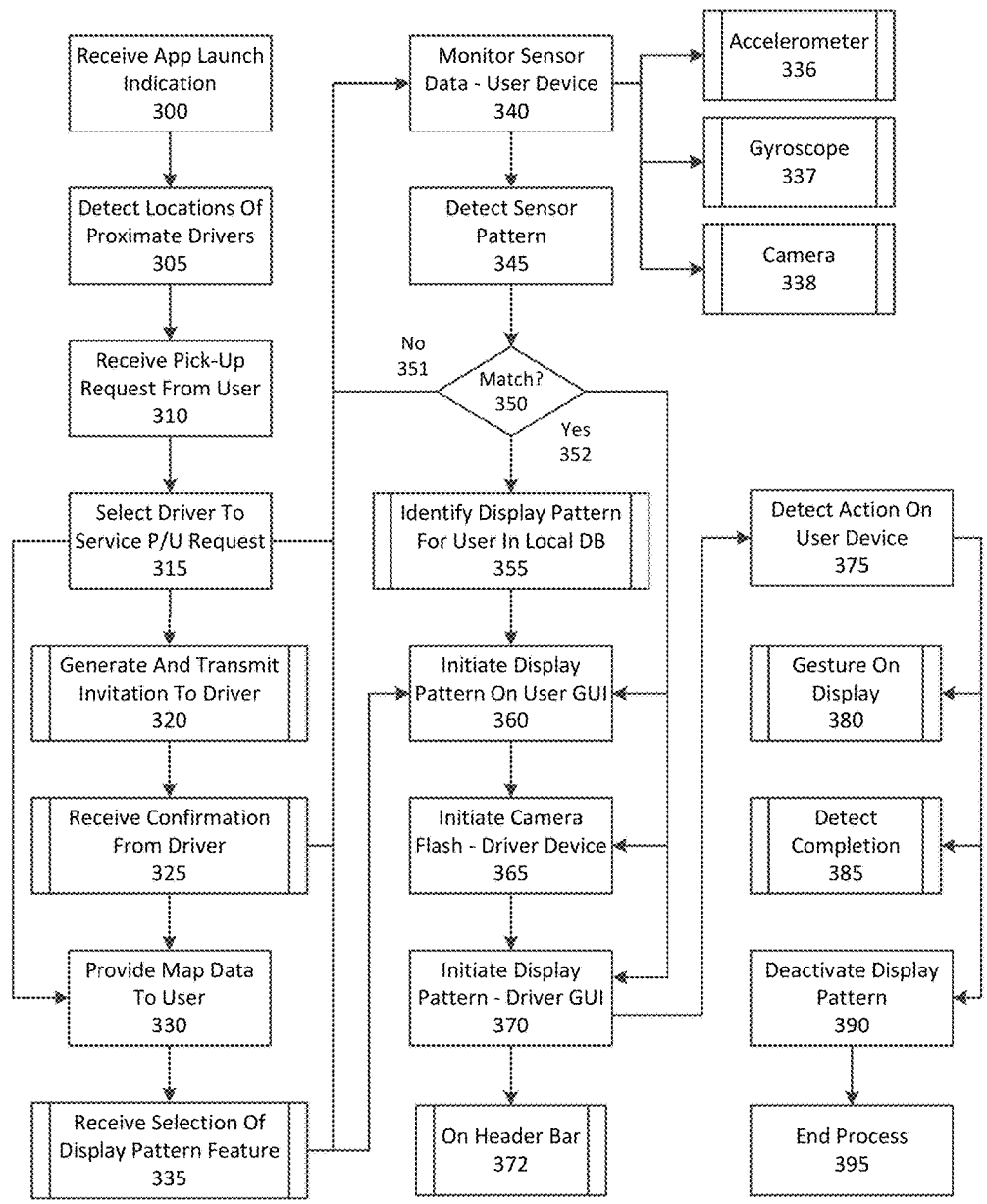
FIG. 3 is a low level flow chart illustrating an example method for facilitating a pick-up in connection with a transportation arrangement service.

FIG. 3 is a low level flow chart illustrating an example method for facilitating a pick-up in connection with a transportation arrangement service. In the below description of FIG. 3, reference may be also made to like reference characters representing various features of FIG. 1 for illustrative purposes. Furthermore, the low level method described in connection with FIG. 3 may also be performed by an example transport facilitation system 100, as illustrated in FIG. 1. Referring to FIG. 3, the transport facilitation system 100 can receive an indication of the user application being launched on a user device 185 (300). In response to detecting the application launch, the transport facilitation system 100 can receive location data 106 from the user device 185 and the devices 190 of proximate drivers (e.g., via GPS resources of the devices 185, 190), and detect the locations of all available proximate drivers within a predetermined distance or time from the user (305). The transport facilitation system 100 can receive a pick-up request 107 from the user device 185 (310), and in response, the transport facilitation system 100 can select one of the proximate drivers to service the pick-up request 107 (315).

In many examples, the transport facilitation system 100 can select the driver based on physical proximity or temporal distance (e.g., depending on traffic). Additionally or alternatively, the driver may be selected based on variety of other factors, as provided above with respect to FIG. 1. Upon selecting a driver, the transport facilitation system 100 can generate and transmit an invitation to the selected driver's device 190 to service the pick-up request 107 (320). If the driver accepts, the transport facilitation system 100 can receive a confirmation 193 from the driver device 190 (325).

The confirmation 193 from the driver device 190 can trigger a number of features of the transport facilitation system 100. For example, the confirmation 193 can trigger the mapping module 120 to transmit map data 163 to the user device 185 and the driver device 190 (330). The map data 163 can be different for the user compared to the driver. As an example, the map data 163 can provide the user with a live icon indicating a dynamic location of the driver and an ETA. On the driver's end, the map data 163 can comprise live directions to the pick-up location. Optionally, the GUI 187 on the user device 185 can include a display pattern feature that the user can select to enable the display pattern presentation. Accordingly, the transport facilitation system 100 can receive, over the network 175, a selection of the display pattern feature from the user device 185 (335), which can trigger the transport facilitation system 100 to monitor sensor data 186 from the user device (340). Alternatively, as shown in FIG. 3, the confirmation 193 from the driver device 190 can trigger the transport facilitation system 100 to monitor sensor data 186 from the user device (340).

When the driver approaches the user, the user may perform an action, such as a hailing action, with the user device 185. The transport facilitation system 100 can detect a sensor pattern matching the user action from sensor resources of the user device 185 (e.g., accelerometer (336), gyroscopic sensor (337), camera (338), and the like) (345). At decision block (350), the transport facilitation system 100 can perform a comparison technique to determine whether the detected sensor pattern from the user device 185 matches a predetermined sensor pattern. The determination can comprise a probabilistic computation in which a match is identified when the match probability crosses a predetermined threshold (e.g., a 75% match). If the detected sensor pattern does not match the predetermined pattern (351), then the transport facilitation system can continue to monitor the sensor data 186 from the user device 185 (340). However, if a match is identified (352), then the transport facilitation system 100 performs a number of triggered actions.

As illustrated in FIG. 3, a sensor pattern match can trigger the transport facilitation system 100 to identify a display pattern for the requesting user in the database 130 (355). If the user has preselected a display pattern, for example, in the user profile 136, the transport facilitation system 100 can generate a display trigger 179, comprising the pattern data for the preselected display pattern, and transmit the display trigger signal 179 to the user device 185 to initiate the preselected display pattern (360). The transportation facilitation system 100 can also transmit a trigger signal to the driver device 190, such that the same display pattern can be initiated on the display screen of the driver device 190 (370) (e.g., on the header bar (372)). At the same time, the transport facilitation system 100 can initiate the camera flash light on the rear side of the driver device 190 to enable the requesting user to easily identify the pickup vehicle (365).

Alternatively, if a display pattern is not preselected by the requesting user, the transport facilitation system 100 can include a pattern selector 160 select a display pattern from a pattern catalog 138 in the database 130. For examples, the pattern selector 160 can select a particular display pattern such that is not current assigned to another user/driver pair in the vicinity of the requesting user.

The display pattern can be activated on the user device 185 and the driver device 190 for a predetermined time period, or can be deactivated in any number of ways. As such, the transport facilitation system 100 can detect a user action on the user device 185 (375). The user action can comprise a gesture, such as a tap, performed on the display screen (380). Additionally or alternatively, the user action can comprise the completion of the hailing action, as in the detection of a reverse hailing action (385). Any number of user actions are contemplated (e.g., depression of an analog key or button on the mobile device, a driver input, etc.). Upon detecting the user action, the transport facilitation system 100 can deactivate the display pattern on the user device 185 and the driver device 190 (390). Upon successful facilitation of the rendezvous, the process can end (395).

USER INTERFACE EXAMPLES

FIGS. 4A and 4B are example screenshots illustrating a user device executing a designated user application. Referring to FIG. 4A, a requesting user may launch a designated application specific to a network service on the user's device 400. In response to launching the application, a GUI 410 can be generated on the device 400 showing a location window 402, which can be associated with a location pin 404 on the device. The location pin 404 can be shown, by default, close to or at the current location of the user. The location window 402 can enable the user to input an address or location for pick-up. Additionally or alternatively, the user can provide input on the map on the GUI 410 to move the location pin 404 to a given location to specify a pick-up location. Upon setting the location pin 404, the location window 402 can automatically display an address corresponding to the location pin 404. In the example provided, the user has placed the location pin 404 for pick-up at the Palace of Fine Arts Theater, as identified in location window 402. The GUI 410 can further include a header bar 401, which can be selectable to toggle the application, access user profile data, access payment history data, access information about the application, access promotional content, and the like.

The GUI 410 can further include a service selector 408 which can enable the user to select a service type. For example, "uberX" as shown in FIG. 4A can correspond to one service type, while "Black Car" can correspond to a different, second service type. Similarly, a secondary selection feature can enable the user to select either "uberX" or "uberXL," in this example, which corresponds to a standard size vehicle or a larger size vehicle (SUV), respectively. The GUI 410 may also display the relative locations of proximate drivers 406 to the requesting user's current location, or to the placement of the location pin 404, that corresponds to the currently selected service type (e.g., in this example, vehicles are shown that correspond to the "uberX" service type). The user may utilize a selection feature, for example, a selection feature on the location pin 404, to request a pick-up. The user may then set a destination location and submit the pick-up request.

Referring to FIG. 4B, upon requesting a pick-up, the GUI 410 can display a pin on the pick-up location 418, and the location window 402 can reflect the pick-up address. The GUI 410 can also disregard other proximate drivers, leaving only an icon for the selected driver 416. The GUI 410 can include an ETA indicator 414 to show an estimated time of arrival for the selected driver. In some implementations, the GUI 410 can also include a selectable icon 412 to enable the display pattern feature on the user device 400. As an example, if the user is in a crowded area in which many would-be riders are simultaneously requesting a transportation service, the user can select the selectable icon 412 to enable the display pattern feature. When the selected driver 416 is indicated as being close by (e.g., within visual range), an indication can pop up on the display screen to prompt the user to perform a hailing action. Alternatively, selection of the selectable icon 412 can trigger the display pattern to be displayed on the GUI 410. Alternatively still, the GUI 410 can forgo the selectable icon 412, and the display pattern can be automatically triggered when the user performs the hailing action.

Figures 4C, 4D:
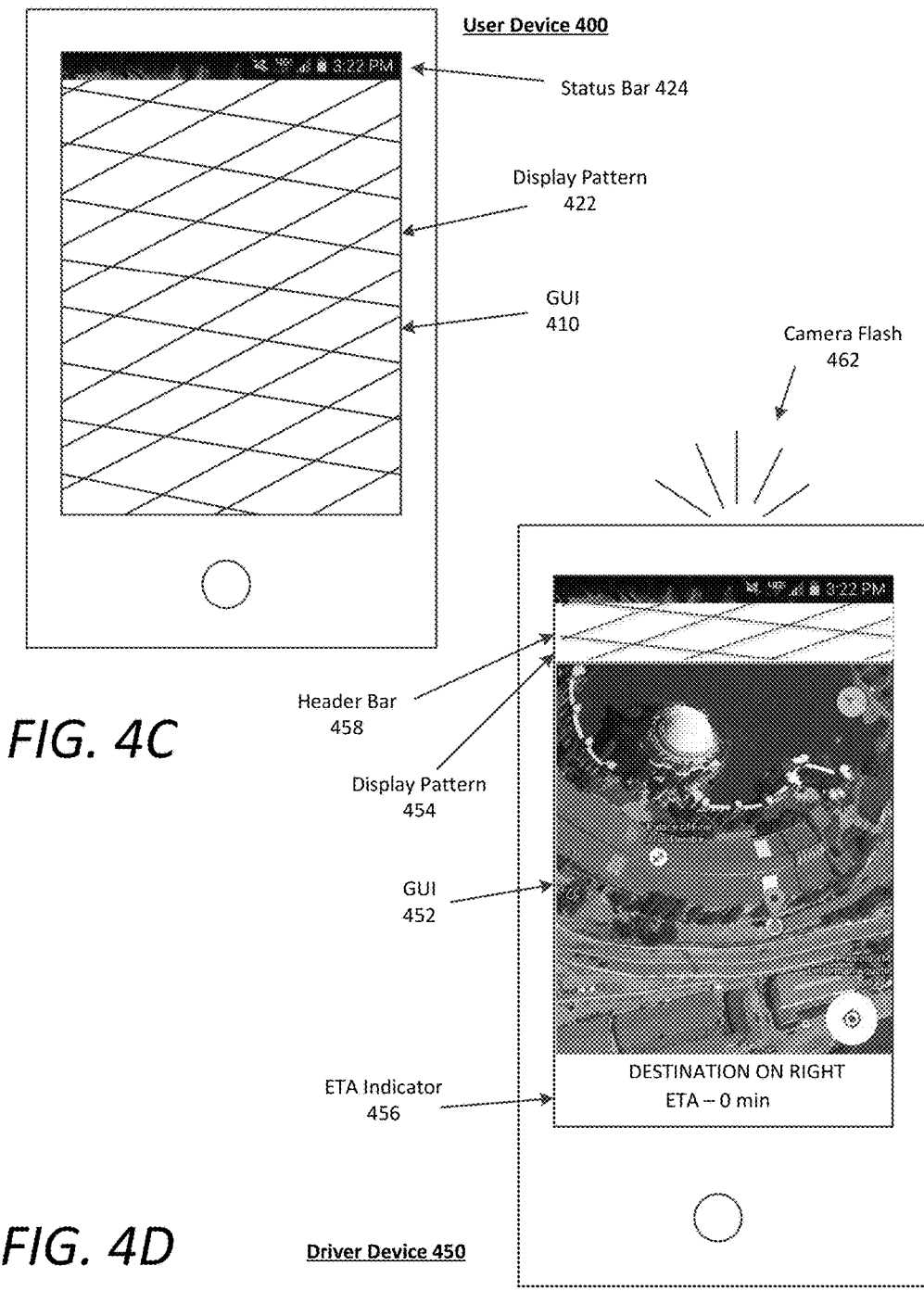
FIG. 4C is an example screenshot showing a user device on which a display pattern is initiated.
FIG. 4D is an example screenshot showing a driver device on which a display pattern is initiated.

FIG. 4C is an example screenshot showing a user device on which a display pattern is initiated. The display pattern 422 can be any visually distinct image, color, and/or pattern that can be displayed for a duration of time or can flash at any given frequency. As provided above, the display pattern 422 can be triggered by a hailing action performed by the user and can encompass the entirety of the GUI 410 on the user device 400. In the example shown in FIG. 4C, the display pattern 422 is provided on the entire GUI 410, leaving only the status bar 424 unaffected. However, examples are contemplated where the display pattern 422 covers only a selected portion of the GUI 410, or is even pushed to encompass the status bar 424. Still further, in some examples, the display pattern 422 can stop being displayed on the GUI 410 in response to a trigger, such as in response to the user making another hailing action, or in response to receiving data from the network service (e.g., after the driver provides an input on the driver device or after the transportation service is determined to have begun, etc.).

FIG. 4D is an example screenshot showing a driver device on which a display pattern is initiated. The display pattern 454 on the driver device 450 can be visually similar or the same as the display pattern 422 on the user device 400. In many examples, the display pattern 454 on the driver device 450 can encompass a portion of the GUI 452, such as the header bar 458, the status bar, or both. In the example provided, the display pattern 454 is initiated on the header bar 458 of the driver device 450, so that the driver can still view the directions or map data on the GUI 452.

The GUI 452 can also include an ETA indicator 456, which, as shown in FIG. 4D, illustrates that the driver has arrived at the pick-up location. The driver may then view the display pattern 454 on the header bar 458, which can be visually distinct enough to be perceived in the driver's peripheral vision. Thus, the driver can readily identify and match the display patterns 422, 454 being displayed on both the user device 400 and the driver device 450. In conjunction with the display pattern 454, the camera flash 462 on the rear side of the driver device 450 can also initiate to enable the requesting user to readily identify the pick-up vehicle. After a predetermined time period (e.g., 3-5 seconds), the display patterns 422, 454 and the camera flash 462 can be deactivated automatically. Alternatively, the display patterns 422, 454 and the camera flash can be deactivated via user or driver input.

In variations, the ETA indicator 456 can include the name of the user being picked up, and can be located on any portion of the driver device 450. Design layouts of the GUI 452 can provide dynamic directions to the pick-up locations just under the header bar 458. The ETA indicator 456 can also be located on or under the header bar 458, while the GUI 452 can present a map coinciding with the directions and the ETA indicator 456. When the display pattern 454 is triggered on the driver device 450, it can be presented as overlaying the header bar 458, the status bar, or any other portion of the GUI 452. Accordingly, the layout of the GUI 452 is not limited to the particular layout as shown in FIG. 4D.

Hardware Diagrams

Figure 5:
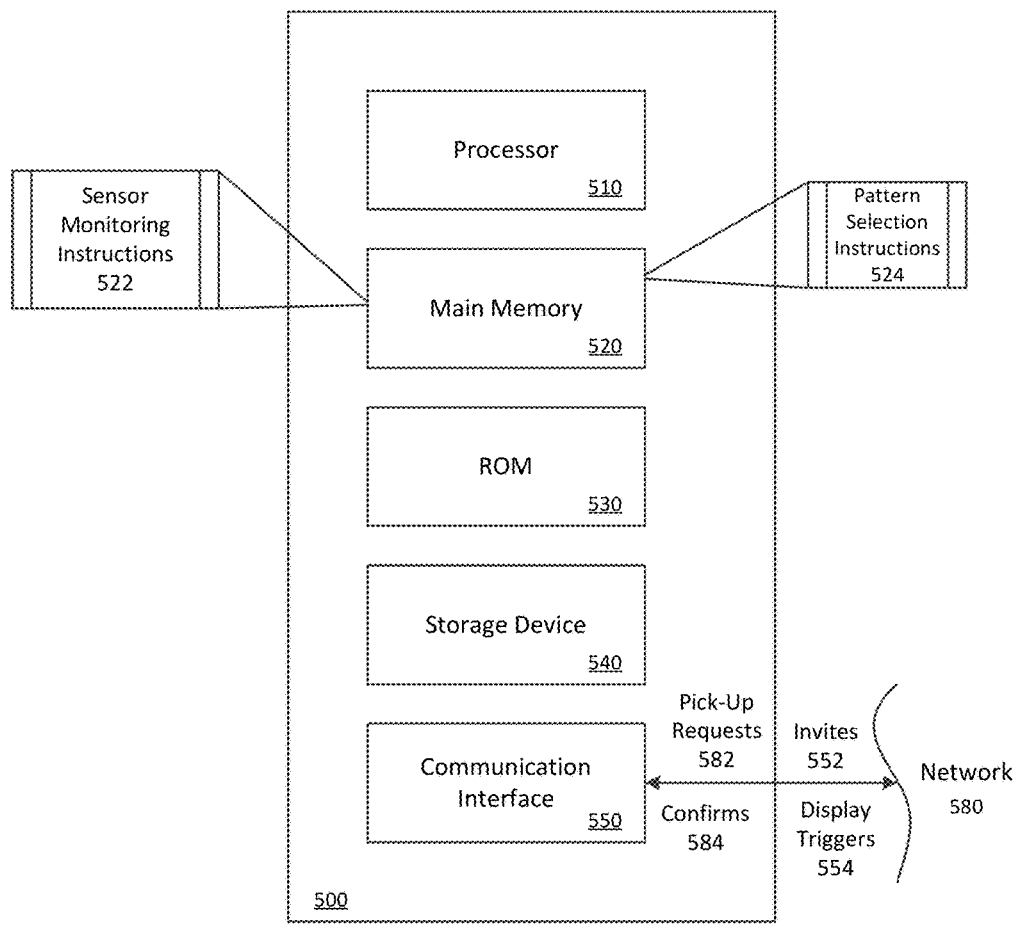
FIG. 5 is a block diagram illustrating a computer system upon which examples described herein may be implemented.

FIG. 5 is a block diagram that illustrates a computer system upon which examples described herein may be implemented. A computer system 500 can be implemented on, for example, a server or combination of servers. For example, the computer system 500 may be implemented as part of a network service for providing transportation services. In the context of FIG. 1, the transport facilitation system 100 may be implemented using a computer system such as described by FIG. 5. The transport facilitation system 100 may also be implemented using a combination of multiple computer systems as described in connection with FIG. 5.

In one implementation, the computer system 500 includes processing resources 510, a main memory 520, a read-only memory (ROM) 530, a storage device 540, and a communication interface 550. The computer system 500 includes at least one processor 510 for processing information stored in the main memory 520, such as provided by a random access memory (RAM) or other dynamic storage device, for storing information and instructions which are executable by the processor 510. The main memory 520 also may be used for storing temporary variables or other intermediate information during execution of instructions to be executed by the processor 510. The computer system 500 may also include the ROM 530 or other static storage device for storing static information and instructions for the processor 510. A storage device 540, such as a magnetic disk or optical disk, is provided for storing information and instructions.

The communication interface 550 enables the computer system 500 to communicate with one or more networks 580 (e.g., cellular network) through use of the network link (wireless or wired). Using the network link, the computer system 500 can communicate with one or more computing devices, and one or more servers. In accordance with examples, the computer system 500 receives pick-up requests 582 from mobile computing devices of individual users. The executable instructions stored in the memory 530 can include sensor monitoring instructions 522, which the processor 510 executes to monitor sensor data from the user device to identify when a distinct user action (e.g., a hailing action) has occurred. The executable instructions stored in the memory 520 can also include pattern selection instructions 524, which enable the computer system 500 to select an appropriate display pattern for execution on both the user and driver devices, as described herein. By way of example, the instructions and data stored in the memory 520 can be executed by the processor 510 to implement an example transport facilitation system 100 of FIG. 1. In performing the operations, the processor 510 can receive pick-up requests 582, generate and transmit invitations 552 to drivers to service the pick-up requests 582, receive confirmations 584 from accepting drivers, and transmit display trigger signals 554 via the communication interface 550.

The processor 510 is configured with software and/or other logic to perform one or more processes, steps and other functions described with implementations, such as described by FIGS. 1 through 4D, and elsewhere in the present application.

Examples described herein are related to the use of the computer system 500 for implementing the techniques described herein. According to one example, those techniques are performed by the computer system 500 in response to the processor 510 executing one or more sequences of one or more instructions contained in the main memory 520. Such instructions may be read into the main memory 520 from another machine-readable medium, such as the storage device 540. Execution of the sequences of instructions contained in the main memory 520 causes the processor 510 to perform the process steps described herein. In alternative implementations, hard-wired circuitry may be used in place of or in combination with software instructions to implement examples described herein. Thus, the examples described are not limited to any specific combination of hardware circuitry and software.

Figure 6:
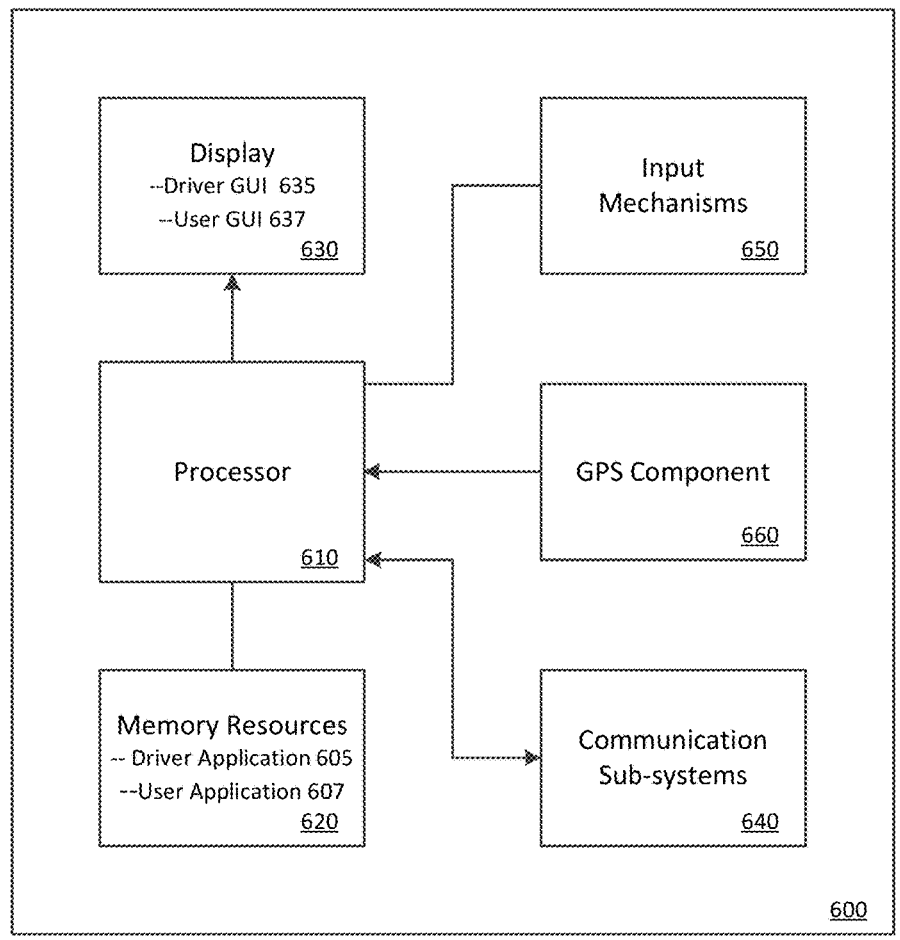
FIG. 6 is a block diagram illustrating a mobile computing device upon which examples described herein may be implemented.

FIG. 6 is a block diagram that illustrates a mobile computing device upon which examples described herein may be implemented. In one example, a mobile computing device 600 may correspond to, for example, a cellular communication device (e.g., feature phone, smartphone etc.) that is capable of telephony, messaging, and/or data services. In variations, the mobile computing device 600 can correspond to, for example, a tablet or wearable computing device. Still further, the mobile computing device 600 can be distributed amongst multiple portable devices of drivers, and requesting users.

In an example of FIG. 6, the computing device 600 includes a processor 610, memory resources 620, a display device 630 (e.g., such as a touch-sensitive display device), one or more communication sub-systems 640 (including wireless communication sub-systems), input mechanisms 650 (e.g., an input mechanism can include or be part of the touch-sensitive display device), and one or more location detection mechanisms (e.g., GPS component) 660. In one example, at least one of the communication sub-systems 640 sends and receives cellular data over data channels and voice channels.

A driver of a transport vehicle can operate the mobile computing device 600 when on a shift to provide transportation services. The memory resources 620 can store a designated driver application 605 for linking the mobile computing device 600 with a network service that enables or otherwise facilitates the drivers' ability to efficiently service pick-up requests. Execution of the driver application 605 by the processor 610 may cause a specified driver graphical user interface (GUI) 635 to be generated on the display 630. Interaction with the driver GUI 635 can enable drivers of transport vehicles to receive assignments to service pick-up requests or perform a pickup and/or drop-off.

A requesting user of the network service can operate the mobile computing device 600 to transmit a pick-up request including a pick-up location. The memory resources 620 can store a designated user application 607 to link the requesting user with the network service to facilitate a pick-up. Execution of the user application 607 by the processor 610 can cause a user GUI 637 to be generated on the display 630. User interaction with the user GUI 637 can enable the user to transmit a pick-up request in connection with the network service, which enables driver to accept an invitation to service the pick-up request. Furthermore, display patterns may be initiated on both the user GUI 637 and the driver GUI 635.

While examples of FIG. 5 and FIG. 6 provide for a computer system 500 and mobile computing device 600 for implementing aspects described, in some variations, the mobile computing device 600 can operate to implement some or all of the functionality described with the transport facilitation system 100.

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this are. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. A transport facilitation system comprising:
   one or more processors; and
   one or more memory resources storing instructions for facilitating a pick-up in connection with a transportation arrangement service, wherein the instructions, when executed by the one or more processors, cause the transport facilitation system to:
   receive a pick-up request, over one or more networks, from a user device of a requesting user;
   select a driver of a vehicle to service the pick-up request;
   transmit an invitation to service the pick-up request to a driver device of the driver;
   receive a confirmation to service the pick-up request from the driver device;
   detect, from the user device, a sensor pattern corresponding to a hailing action performed using the user device; and
   in response to detecting the sensor pattern, (i) transmit a trigger signal to initiate a selected display pattern on a graphical user interface (GUI) of the user device, and (ii) transmit a second trigger signal to the driver device, the second trigger signal causing the driver device to initiate the selected display pattern on a header bar of a GUI of the driver device and a camera flash component on a rear side of the driver device to enable the requesting user to identify the vehicle.

2. The transport facilitation system of claim 1, wherein the GUI of the user device is generated via execution of a user application, and wherein the GUI of the driver device is generated via execution of a driver application, the user and driver applications being associated with the transportation arrangement service facilitated by the transport facilitation system.

3. The transport facilitation system of claim 2, wherein the executed instructions further cause the transport facilitation system to:
   provide, on the GUI of the user device, a catalog of display patterns; and
   receive a user selection, from the user device, of the selected display pattern from the catalog of display patterns;
   wherein initiating the selected display pattern on the GUI of the user device and the GUI of the driver device is based on the user selection.

4. The transport facilitation system of claim 3, wherein the executed instructions further cause the transport facilitation system to:
   provide a selectable feature on the GUI of the user device to enable the requesting user to select a display pattern feature of the user application, wherein selection of the display pattern feature triggers the transport facilitation system to (i) detect the sensor pattern corresponding to the hailing action, and (ii) initiate the selected display pattern on the GUI of the user device.

5. The transport facilitation system of claim 1, wherein the executed instructions cause the selected display pattern to be displayed on the GUI of the user device and the GUI of the driver device for a predetermined time period.

6. The transport facilitation system of claim 1, wherein the selected display pattern comprises a unique color that flashes on the GUIs of the user and driver devices at a predetermined frequency.

7. The transport facilitation system of claim 1, wherein the selected display pattern comprises a series of unique colors that flash in a preselected sequence on the GUIs of the user and driver devices.

8. The transport facilitation system of claim 1, wherein the executed instructions further cause the transport facilitation system to:
   in response to receiving the confirmation to service the pick-up request from the driver device, monitor sensor data from the user device to detect the sensor pattern.

9. The transport facilitation system of claim 8, wherein the executed instructions cause the transport facilitation system to monitor the sensor data from one or more of an accelerometer and a gyroscope of the user device.

10. The transport facilitation system of claim 9, wherein the executed instructions cause the transport facilitation system to detect the sensor pattern from the user device by comparing the sensor data to a predetermined mapping of the sensor pattern.

11. The transport facilitation system of claim 8, wherein the executed instructions further cause the transport facilitation system to:
   detect, from the sensor data, an end to the hailing action; and
   in response to detecting the end to the hailing action, terminate the selected display pattern on the GUI of the user device.

12. The transport facilitation system of claim 1, wherein the executed instructions further cause the transport facilitation system to:
   identify a plurality of current requesting users within a proximity of the requesting user; and
   select the selected display pattern from a catalog of display patterns such that the selected display pattern does not match other display patterns for any of the plurality of current requesting users.

13. A method for facilitating a pick-up in connection with a transportation arrangement service, the method comprising:
- receiving a pick-up request, over one or more networks, from a user device of a requesting user;
- selecting a driver of a vehicle to service the pick-up request;
- transmitting an invitation to service the pick-up request to a driver device of the driver;
- receiving a confirmation to service the pick-up request from the driver device;
- detecting, from the user device, a sensor pattern corresponding to a hailing action performed using the user device; and
- in response to detecting the sensor pattern, (i) transmitting a trigger signal to initiate a selected display pattern on a graphical user interface (GUI) of the user device to enable the driver to identify the requesting user, and (ii) transmitting a second trigger signal to the driver device, the second trigger signal causing the driver device to generate the selected display pattern on a header bar of a GUI of the driver device and initiate a camera flash component on a rear side of the driver device to enable the requesting user to identify the vehicle.

14. The method of claim 13, wherein the GUI of the user device is generated via execution of a user application, and wherein the GUI of the driver device is generated via execution of a driver application, the user and driver applications being associated with the transportation arrangement service.

15. A non-transitory computer-readable medium storing instructions that, when executed by one or more processors, cause the one or more processors to:
- receive a pick-up request, over one or more networks, from a user device of a requesting user;
- select a driver of a vehicle to service the pick-up request;
- transmit an invitation to service the pick-up request to a driver device of the driver;
- receive a confirmation to service the pick-up request from the driver device;
- detect, from the user device, a sensor pattern corresponding to a hailing action performed using the user device; and
- in response to detecting the sensor pattern, (i) transmit a trigger signal to initiate a selected display pattern on a graphical user interface (GUI) of the user device, and (ii) transmit a second trigger signal to the driver device, the second trigger signal causing the driver device to generate the selected display pattern on a header bar of a GUI of the driver device and initiate a camera flash component on a rear side of the driver device to enable the requesting user to identify the vehicle.

16. The non-transitory computer-readable medium of claim 15, wherein the GUI of the user device is generated via execution of a user application, and wherein the GUI of the driver device is generated via execution of a driver application, the user and driver applications being associated with a transportation arrangement service.

17. The non-transitory computer-readable medium of claim 16, wherein the executed instructions further cause the one or more processors to:
- provide, on the GUI of the user device, a catalog of display patterns; and
- receive a user selection, from the user device, of the selected display pattern from the catalog of display patterns;
- wherein initiating the selected display pattern on the GUI of the user device and the GUI of the driver device is based on the user selection.

18. The non-transitory computer-readable medium of claim 17, wherein the executed instructions further cause the one or more processors to:
- provide a selectable feature on the GUI of the user device to enable the requesting user to select a display pattern feature of the user application, wherein selection of the display pattern feature triggers the one or more processors to (i) detect the sensor pattern corresponding to the hailing action, and (ii) initiate the selected display pattern on the GUI of the user device.

* * * * *